United States Patent [19]

Shyu et al.

[11] Patent Number: 4,753,997
[45] Date of Patent: Jun. 28, 1988

[54] PROCESS FOR GRAFTING MALEIC ANHYDRIDE OR STYRENE-MALEIC ANHYDRIDE ONTO POLYOLEFINS

[75] Inventors: Wen B. Shyu, Chagrin Falls, Ohio; David A. Woodhead, South Glamorgan, United Kingdom

[73] Assignee: The Standard Oil Company, Cleveland, Ohio

[21] Appl. No.: 802,497

[22] Filed: Nov. 27, 1985

[51] Int. Cl.$^4$ ............................................. C08F 255/02
[52] U.S. Cl. ................................. 525/259; 525/263; 525/264; 525/265; 525/293; 525/285
[58] Field of Search ................. 525/259, 285; 526/220, 526/211

[56] References Cited

U.S. PATENT DOCUMENTS

| | | | |
|---|---|---|---|
| 3,131,990 | 5/1964 | Bonvicini et al. | 525/285 |
| 3,414,551 | 12/1968 | Reid et al. | |
| 4,054,719 | 10/1977 | Cordes, III | |
| 4,070,262 | 1/1978 | Guarino et al. | |
| 4,071,425 | 1/1978 | Guarino et al. | |
| 4,131,529 | 12/1978 | Osterloh et al. | |
| 4,134,813 | 1/1979 | Kuesters et al. | |
| 4,146,452 | 3/1979 | Weber et al. | |
| 4,219,626 | 8/1980 | Wolfers et al. | 526/220 |
| 4,284,551 | 8/1981 | Argentar | 525/259 |
| 4,506,056 | 3/1985 | Gaylord | 525/285 |

FOREIGN PATENT DOCUMENTS

| | | | |
|---|---|---|---|
| 45-1281 | 1/1970 | Japan | 525/285 |
| 892133 | 3/1962 | United Kingdom | 525/259 |

OTHER PUBLICATIONS

Ludwig, "Adhesion and Property Enhancement Via Acrylic–Acid Grafted Polyolefins"; *Modern Plastics*, pp. 78–82, Jan. 1983.
Usmani, "Polymer Science and Technology: A Status Report", Journal Macromolecular Science–Chemistry, 1983, pp. 61–78.
Ide et al.; "The Reaction of Isotactic Polypropylene with Maleic Anhydride, and Ionic Crosslinking of the Obtained Products"; Central Research Laboratory, Mitsubishi Rayon CO., Ltd. (Otake, Hiroshima) pp. 107–115 (1968) Kobunshi Kagaku 25, 107.
"Non–Degradative Reaction of Maleic Anhydride . . . Presence of Peroxides", Journal Polymer Science, Polymer Letters Edition, 21, 23 (1983) pp. 1–15; Gaylord et al.
"Alternating Copolymer Graft Copolymers . . . Anhydride Complex"; Polymer Letters, vol. 10, pp. 95–100, 1972; Gaylord et al.
"Participation of Excited Species . . . Maleic Anhydride"; Polymer Letters Edition, vol. 11, pp. 253–256 (1973); Gaylord et al.
"Participation of Cationic Intermediates . . . Maleic Anhydride"; Journal of Polymer Science; Polymer Letters Edition, vol. 19, pp. 107–112 (1981); Gaylord et al.
Abstract: "Effect of Grafting of Unsaturated Carboxylic Acid on Glassifiber-Reinforced Polypropylene"; Kobunshi Ronbunshu 38, pp. 67–74 (1981; Sasaki et al.).

*Primary Examiner*—Wilbert J. Briggs, Sr.
*Attorney, Agent, or Firm*—M. F. Esposito; D. J. Untener; L. W. Evans

[57] ABSTRACT

A method of grafting maleic anhydride or maleic anhydride/styrene onto a polyolefin, in particular polypropylene comprising mixing maleic anhydride or maleic anhydride-styrene/styrene homologue with the polyolefin in the presence of a catalyst having the formula:

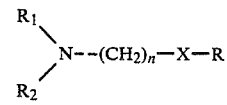

wherein
X=S, O or N;
$R_1$ and $R_2$=an alkyl group, for example $C_1$–$C_{14}$ or higher;
R=H or

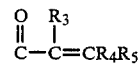

wherein $R_3$, $R_4$ and $R_5$ equal H, an alkyl group, $(CH_2)_n COOH$, or mixtures thereof; and n=1 to about 6.

19 Claims, No Drawings

PROCESS FOR GRAFTING MALEIC ANHYDRIDE OR STYRENE-MALEIC ANHYDRIDE ONTO POLYOLEFINS

BACKGROUND OF THE INVENTION

The present invention is directed to a process for grafting maleic anhydride or styrene-maleic anhydride complexes onto polyolefins. In particular, the present invention is directed to a process for grafting maleic anhydride or styrene-maleic anhydride onto propylene polymers. More particular, the present invention is directed to a process for grafting maleic anhydride onto polypropylene by the use of a novel catalyst which includes N,N-dialkylethanolamines or N,N-dialkylaminoethyl acrylates (methacrylates) or mixtures thereof.

It has been widely recognized that the specialty chemical industry is the most rapidly growing segment of the U.S. chemical industry. Unlike commodities, specialty chemicals are purchased for the performance and not on chemical specifications. Typically these specialty chemicals are more expensive because they possess unique properties. In the polymer field, it is highly desirable, therefore, to convert plastic commodities into specialties because this would enable one to increase profits. From this point of view, polypropylene plays an important role because of its intrinsic properties such as high melting temperature, low density, high chemical inertness, and its capability to be produced with different morphological and molecular structures. Moreover, it can be modified with the additions of other polymers or mineral fillers and grafted with functional groups. Finally, its low cost and availability in a multiplicity of grades, place polypropylene in an advantageous position in comparison to most other plastic materials.

In order for polypropylene to expand beyond the existing commodity application into the specialty areas, chemical modification for better compatibility with other types of polymers and for better adhesion with various kinds of substrates is necessary. One of the most commonly used approaches for the chemical modification of polypropylene is to incorporate a polar moiety such as a carbonyl group onto the backbone of the polymer. Incorporation of maleic anhydride or acrylic acid onto polypropylene and other polyolefins through graft polymerization has attracted the most attention as a primary means of introducing reactive functionality and publications in this area can be found dating back to about 1960.

Typically, the conventional procedures for grafting maleic anhydride or styrene-maleic anhydride onto propylene have required high reactant levels and/or severe reaction conditions. Moreover, these conventional methods have produced only mediocre graft levels. In fact, no styrene-maleic anhydride technique for grafting onto polypropylene has been commercially practiced to date because of the rigorous exotherm involved in the reaction.

In U.S. Pat. No. 3,414,551 to Reid et al. dated Dec. 3, 1968, the modification of crystalline polypropylene with maleic anhydride is disclosed. The Reid et al. patent discloses a process for reacting propylene with maleic anhydride which does not require a solvent and can be operated at temperatures below the melting point of the polymer. The Reid et al. procedure was a significant step forward in the art with regard to grafting of maleic anhydride onto crystalline polymers, because it appeared to alleviate some of the severe conditions necessary for the reaction to take place. However, the Reid et al. method does not produce significant grafting levels for maleic anhydride on the polymer unless severe reaction conditions are employed. Accordingly, the Reid et al. process has significant room for improvement. The process of the present invention utilizes a novel catalyst component for the grafting of maleic (maleic anhydride) and styrene-maleic complexes [1:1 molar solution (or complex) of styrene (or styrene homologue) with maleic anhydride] onto polypropylene. This process enables one to obtain higher grafting levels for the maleic anhydride or styrene-maleic anhydride complex on the polypropylene at significantly milder reaction conditions. In addition, the process can provide one with a modified polyolefin which does not degrade during the grafting procedure. This, of course, results in an economical process for producing a polymer having improved versatility and potential application over a wide area including adhesives, coextrusion tie layers for multilayer lamanates, metal coatings, polymeric blends, etc.

SUMMARY OF THE INVENTION

The object of the present invention is to provide a novel procedure for grafting maleic anhydride and/or maleic anhydride-styrene onto polyolefins.

It is a further object of the present invention to provide a novel procedure for grafting maleic anhydride and/or maleic anhydride-styrene onto polypropylene.

It is a still further object of the present invention to provide a novel procedure for grafting maleic anhydride and/or styrene-maleic anhydride onto particulate polypropylene without degradation on the polymer.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention as embodied and broadly described herein, the method of the present invention comprises mixing together maleic anhydride, a free radical initiator, a polyolefin and a catalyst having the following formula:

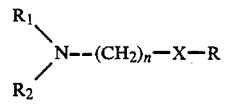

wherein
X=S, O or N;
$R_1$ and $R_2$=an alkyl group, for example $C_1$–$C_{14}$ or higher;
R=H or

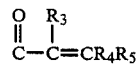

wherein $R_3$, $R_4$ and $R_5$ equals H, an alkyl group, $COOR_6$, where $R_6=H$ or an alkyl group or mixtures thereof; and $n=1$ to about 6, preferably 1 to 3, and heating the mixture to an elevated temperature for a time sufficient to enable the maleic anhydride to react with the polyolefin.

In a preferred embodiment of the present invention, styrene is added to the maleic anhydride prior to mixing with the polyolefin and heating. Most preferably, the styrene and maleic anhydride are present in the mixture in the ratio of approximately 1 to 1.

The significance of the process of the present invention is that it provides a simple, fast and economical procedure for grafting polar functional groups onto polyolefins. The present process provides a process for preparing modified polyolefins having high graft levels of maleic anhydride and styrene while using lower amounts of maleic anhydride monomer or styrene monomer under milder reaction conditions. Moreover, when a particulate polyolefin is utilized, the process of the present invention can provide one with a modified polyolefin which does not exhibit degradation during grafting. The results obtained by the process of the present invention enable one to graft maleic anhydride and styrene-maleic anhydride onto polypropylene at graft levels which are close to the maximum level ever reported. These results are obtained even though much milder reaction conditions are used. It is believed that these results are directly attributable to the presence of the catalyst in the reaction.

Reference will now be made in detail to the present preferred embodiment of the invention.

DETAILED DESCRIPTION OF THE INVENTION

The method of the present invention comprises grafting maleic anhydride or styrene-maleic anhydride complexes onto polyolefins. In particular, the method of the present invention is directed to grafting maleic anhydride or styrene-maleic anhydride onto polypropylene using a catalyst having the following formula:

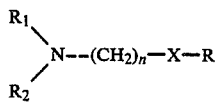

wherein R, $R_1$, and $R_2$ are defined as set forth above.

In general, the procedure comprises mixing together maleic anhydride or maleic anhydride and styrene/styrene homologue (e.g. p-methylstyrene) with a polyolefin and the catalyst. The mixture is then heated to an elevated temperature for a time sufficient to enable the maleic anhydride or maleic anhydride-styrene complex to react with the polyolefin. The process may be performed in the molten or particulate state.

In the molten state, the process comprises adding a mixture of maleic anhydride, a free radical initiator (e.g. a peroxide), and the catalyst having the above-described formula into a container having molten polyolefin maintained at about 170°–190° C. The mixture was blended in the container for about 2 minutes after the addition of the initiator, maleic anhydride and catalyst. Typically, the mixing and addition are performed in an inert atmosphere such as nitrogen.

Typically, the free radical initiator is an organic peroxide. The preferred peroxides used in the process are those that have a half life of about 0.1 to 2.0 hours at the chosen reaction temperature. Examples of these are benzoyl peroxide, lauryl peroxide, and dicumyl peroxide. For a more detailed description of the types of the peroxide used in the process of the present invention, see U.S. Pat. No. 3,414,551 herein incorporated by reference.

In the particulate state reaction, the procedure generally comprises mixing the maleic anhydride, the peroxide and a catalyst as described above with the polypropylene powder at room temperature. This powder-like mixture is then added to a blending apparatus and heated to about 90° C. under a nitrogen atmosphere. The reaction is allowed to proceed for 6 to 10 minutes. The reaction mixture is then removed from the mixing chamber in the form of the powder or it may be continuously heated up to 200° C. to fuse the polymer product. Preferably, a small amount of solvent may be utilized in this procedure. For example, about 5 weight percent of a low boiling ketone (e.g. acetone) will facilitate the reaction. Other suitably conventional low boiling polar solvents may be utilized.

The particulate size of the polypropylene polymer is not critical to the practice of the invention. It is preferred, however, that the particle size be between about 20 to 50 microns with up to 300 microns being acceptable. In particular, a particle size of between 50 to 150 microns is preferred.

The amount of the maleic anhydride used will vary depending on the result desired (i.e. graft level desired). Generally, the objective of the present invention is to prepare a modified polymer which contains at least 0.2 to 10 weight percent of maleic substitution calculated as the anhydride. More commonly, the amount will range from 0.4 to 2.5 weight percent.

As the rate of the reaction varies directly with the temperature and the reactivity of the peroxide compound used, the time required to incorporate (graft) a given amount of the maleic anhydride in the polymer will also normally vary. However, in the process of the present invention, the extent of the grafting is more directly controlled by the manner of adding the maleic or maleic-styrene to the polyolefin and the amount of reagents and not the run time. Typically, adding the maleic anhydride to the polyolefin in a number of additions, preferably equal, (e.g. 4 to 10) will enable grafting to proceed rapidly. Normally, the reaction for each separate addition is completed in about 1 to 5 minutes and further processing does not increase grafting levels.

In another preferred embodiment of the process of the present invention, styrene is added to the maleic anhydride prior to mixing with the particulate polyolefin. In grafting of styrene-maleic anhydride onto the particulate polyolefin, the procedure described above is used except that styrene can be the solvent for the maleic anhydride. In this procedure, the maleic anhydride is first dissolved in styrene by heating to 60° C. before the mixture is introduced into the mixing chamber. An inert solvent (ketone—e.g. acetone) is not necessary but may be added as an option. Moreover, this reaction will proceed without the addition of a free radical initiator although an initiator may be used.

Typically, the mixing chamber comprises a Brabender Plasticorder which blends the mixture at temperatures ranging between 90°–180° C. at 60 rpm under a nitrogen atmosphere.

In a further preferred embodiment of the present invention, the catalysts comprise N,N-diisopropylethanolamine, N,N-dimethylethanolamine, and N,N-diethylaminoethyl acrylate (methacrylate).

The invention will now be illustrated by means of the specific examples set forth below. In the examples, parts and percentages are by weight unless otherwise specified.

EXAMPLES 1-8

(Molten Polypropylene)

The procedure used in the following examples was substantially the same in all instances, except that Examples 1, 2 and 6 did not contain any catalyst. A mixture of maleic anhydride, the peroxide and selected catalyst were added in 4 portions at 2 minute intervals to a Brabender Plasticorder containing molten polypropylene at 180° C. and 60 rpm under a nitrogen atmosphere. Prior to the addition of the mixture to the polypropylene, it had been heated for about 2 minutes. After the mixture was added, mixing was continued for about 2 minutes and then the mixture was removed. The results are set forth below in Table I. As can be readily seen from Table I, the process of the present invention using applicants' catalyst dramatically improves the grafting results.

TABLE I

Maleation[1] of Isotactic Polypropylene-N,N—Dialkylethanolamines and N,N—Dialkylaminoethyl Acrylates as Catalysts

| Examples: | 1 (Control) | 2 (Control) | 3 | 4 | 5 | 6 (Control) | 7 | 8 |
|---|---|---|---|---|---|---|---|---|
| Components: | | | | | | | | |
| i-polypropylene | 36 (gm) | 36 | 36 | 36 | 36 | 36 | 36 | 36 |
| MAH | 1.8 | 1.8 | 1.8 | 1.8 | 1.8 | 5.4 | 5.4 | 5.4 |
| DiCup | — | 0.18 | 0.18 | 0.18 | 0.18 | 0.54 | 0.54 | 0.53 |
| N,N—diisopropylethanolamine | — | — | 0.09 | — | — | — | 0.32 | 0.32 |
| N,N—dimethylethanolamine | — | — | — | 0.06 | — | — | — | — |
| N,N—diethylaminoethyl acrylate | — | — | — | — | 0.18 | — | — | — |
| RESULTS: | | | | | | | | |
| Polymer Degradation | No | Yes | Yes | Yes | Yes | Yes | Yes | Yes |
| Graft MAH[3] (wt %) | 0.35 | 0.80 | 1.30 | 1.22 | 1.36 | 1.22 | 2.55 | 2.28 |
| Fraction of Bound MAH[4] (wt %) | 7 | 16 | 26 | 25 | 28 | 8 | 17 | 16 |

NOTES:
[1]In molten state, mixture of MAH, peroxides and amines were added in 4 portions, unless otherwise specified, to fluxing i-PP in the Brabender Plasticorder.
[2]Mixture of MAH, peroxide, and amine were added in 10 portions.
[3]Data based on total weight of modified product.
[4]Data based on MAH in the feed.

EXAMPLES 9-11

The procedure used for preparation of the graft polypropylene was substantially the same as that described for Examples 1 to 8. However, Examples 9 and 10 contained tertiary amines which are not encompassed by applicants' invention. Example 11 contains a catalyst of the present invention. The results clearly demonstrate the superior results of applicants' procedure.

TABLE II

Maleation of Isotactic Polypropylene-Other Tertiary Amines as Catalysts

| | Molten State (180° C.) | | |
|---|---|---|---|
| Examples: | 9 | 10 | 11 |
| Components: | | | |
| i-polypropylene | 36 | 36 | 36 |
| MAH | 1.8 | 1.8 | 1.8 |
| DiCup | 0.18 | 0.18 | 0.18 |
| Trioctylamine | 0.36 | — | — |
| N,N—dimethyl-p-toluidine | — | 0.10 | — |
| N,N—diisopropylethanolamine | — | — | 0.10 |
| RESULTS: | | | |
| Polymer Degradation | Yes | Yes | Yes |
| Graft MAH[1] (wt %) | 0.75 | 0.87 | 1.31 |
| Fraction of Bound MAH[2] (wt %) | 15 | 17 | 27 |

NOTES:
[1]Data based on total weight of modified product.
[2]Data based on MAH in the feed.

EXAMPLES 12-15

A styrene-maleic anhydride grafting of polypropylene was carried out in these examples wherein polypropylene was maintained in its molten state. The procedures for the reaction and purification were the same as described in Examples 1-8, except that maleic anhydride was dissolved in styrene by heating to 60° C. prior to introducing the mixture into the mixing chamber. The results are set forth below in Table III.

EXAMPLES 16-18

The following examples were performed with polypropylene in the particulate form. A mixture of maleic anhydride, styrene, Lupersol ®11 (peroxide) and selected catalyst were mixed with polypropylene powder at room temperature. This powder-like mixture was then added to a semisealed Brabender Plasticorder at 90° C. and 60 rpm under a nitrogen atmosphere. The reaction was allowed to continue for about 8 minutes. The results of these examples are set forth below in Table III. These results clearly demonstrate the dramatic grafting improvement obtained by applicants' claimed procedure. In addition, no degradation on the polymer is observed during this procedure compared to the molten route set forth in the previous examples. The particulate route appears to be more effective in styromaleation and can produce a modified polymer which does not have degradation.

TABLE III

Styro-Maleation of Isotactic Polypropylene

| Examples: | Molten State (180° C.) | | | | Particulate Solid State (90° C.) | | |
|---|---|---|---|---|---|---|---|
| | 12 (Control) | 13 | 14 | 15 | 16 Control[1] | 17 Control[2] | 18 |
| Components: | | | | | | | |
| i-PP | 36 (gm) | 36 | 36 | 36 | 36 | 36 | 36 |
| MAH | 1.8 | 1.8 | 1.8 | 1.8 | 1.8 | 1.8 | 1.8 |
| Styrene | 1.91 | 1.91 | 0.19 | — | 1.91 | 1.91 | 1.91 |
| p-Methylstyrene | — | — | — | 0.15 | — | — | — |
| DiCup | — | — | 0.18 | 0.18 | — | — | — |
| Lupersol ® 11[5] | — | — | — | — | 0.24 | 0.24 | 0.24 |
| N,N—diisopropylethanolamine | — | 0.18 | — | — | — | — | 0.10 |
| RESULTS: | | | | | | | |
| Polymer Degradation | No | No | Yes | Yes | No | No | No |
| Graft MAH[3] (wt %) | 0.48 | 0.55 | 0.70 | 0.65 | 0.85 | 0.82 | 1.95 |
| Fraction of Bound MAH[4] (wt %) | 10 | 11 | 14 | 13 | 17 | 17 | 41 |

NOTES:
[1] Product in particulate form.
[2] Product in fused form.
[3] Data based on total weight of modified product.
[4] Data based on MAH in the feed.
[5] Lupersol ® 11 - tertiary - butyl peroxy pivalate The foregoing description of a preferred embodiment of the invention has been presented for purposes of illustration and description. It is not intended to be exhaustive or to limit the invention to the precise form disclosed, and obviously many modifications and variations are possible in light of the above teaching. For example, homologues of styrene such as para-methyl styrene and copolymers of polypropylene containing small amounts (e.g. 10-25%) of other polyolefins (e.g. polyethylene) may be utilized in the practice of the present invention. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of grafting maleic anhydride onto a polyolefin to provide a graft polymer containing from about 0.2 to 10 weight percent maleic substitution comprising (1) mixing together maleic anhydride, a free radical initiator comprising an organic peroxide, a polyolefin and a catalyst having the following formula:

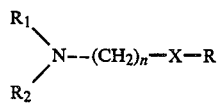

wherein
X=S, O or N;
$R_1$ and $R_2$=an alkyl group;
R=H or

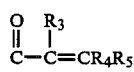

wherein $R_3$, $R_4$ and $R_5$ equal H, an alkyl group, $(CH_2)_nCOOH$, or mixtures thereof; and
n=1 to about 6, and (2) heating said mixture to an elevated temperature for a time sufficient to enable said maleic anhydride to react with said polyolefin.

2. The method of claim 1 wherein said catalyst comprises a N,N-dialkylethanolamine.

3. The process of claim 2 wherein said N,N-dialkylethanolamine is selected from the group consisting of N,N-diisopropylethanolamine and N,N-dimethylethanolamine.

4. The method of claim 1 wherein said catlayst comprises an N,N-dialkylaminoethyl acrylate or methacrylate.

5. The process of claim 3 wherein said polyolefin is polypropylene.

6. The process of claim 5 wherein said polypropylene is used in its molten form.

7. The process of claim 5 wherein said polypropylene is used in its particulate form.

8. The process of claim 7 wherein a low boiling point polar solvent is added to the mixture.

9. The method of claim 3 wherein said polyolefin is a copolymer.

10. The process of grafting a styrene/styrene homologue-maleic anhydride complex onto a polyolefin to provide a graft polymer containing 0.2 to 10 weight percent maleic substitution comprising (1) mixing styrene/styrene homologue-maleic anhydride, polyolefin, a free radical initiator comprising an organic peroxide and a catalyst having the following formula:

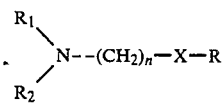

wherein
X=S, O or N;
$R_1$ and $R_2$=an alkyl group;
R=H or

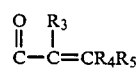

wherein $R_3$, $R_4$ and $R_5$ equal H, an alkyl group, $(CH_2)_nCOOH$, or mixtures thereof; and n=1 to about 6, and (2) heating said mixture to an elevated temperature for a time sufficient to enable said styrene/styrene homologue-maleic anhydride complex to react with said polyolefin.

11. The method of claim 10 wherein said catalyst comprises a N,N-dialkylethanolamine.

12. The process of claim 11 wherein said N,N-dialkylethanolamine is selected from the group consisting of N,N-diisopropylethanolamine and N,N-dimethylethanolamine.

13. The method of claim 10 wherein said catalyst comprises an N,N-dialkylaminoethyl acrylate or methacrylate.

14. The process of claim 12 wherein said polyolefin is polypropylene.

15. The process of claim 14 wherein said polypropylene is used in its particulate form.

16. The process of claim 12 further comprising dissolving said maleic anhydride in said styrene/styrene homologue prior to mixing with said polypropylene and catalyst.

17. The process of claim 16 wherein said polypropylene is used in its particulate form.

18. The process of claim 10 wherein said styrene/styrene homologue to maleic anhydride ratio in said mixture is about 1:1.

19. The process of claim 10 wherein said polyolefin is a copolymer.

* * * * *